(12) United States Patent
Tinnin et al.

(10) Patent No.: US 8,770,058 B2
(45) Date of Patent: Jul. 8, 2014

(54) SYSTEM AND METHOD FOR FIXING A POSITION OF A STEERING COLUMN

(75) Inventors: Melvin L. Tinnin, Clio, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 255 days.

(21) Appl. No.: 13/280,861

(22) Filed: Oct. 25, 2011

(65) Prior Publication Data

US 2012/0304795 A1 Dec. 6, 2012

Related U.S. Application Data

(60) Provisional application No. 61/493,097, filed on Jun. 3, 2011.

(51) Int. Cl.
*B62D 1/16* (2006.01)
*B62D 1/18* (2006.01)
*B62D 1/184* (2006.01)

(52) U.S. Cl.
CPC ..................................... *B62D 1/184* (2013.01)
USPC ............................... 74/495; 74/493; 280/775

(58) Field of Classification Search
USPC ............ 74/29–34, 71, 74, 80, 109, 120, 422, 74/435, 439, 445, 492–498; 280/775–777, 280/779
See application file for complete search history.

(56) References Cited

U.S. PATENT DOCUMENTS

| | | | |
|---|---|---|---|
| 4,541,298 A * | 9/1985 | Strutt | 74/493 |
| 4,658,664 A * | 4/1987 | Jacobs et al. | 74/422 |
| 5,394,767 A * | 3/1995 | Hoblingre et al. | 74/493 |
| 5,606,891 A * | 3/1997 | Tisell et al. | 74/493 |
| 5,722,299 A * | 3/1998 | Yamamoto et al. | 74/493 |
| 6,139,057 A * | 10/2000 | Olgren et al. | 280/775 |
| 6,460,427 B1 | 10/2002 | Hedderly | |
| 6,679,508 B2 | 1/2004 | Smith, Jr. et al. | |
| 6,766,712 B2 | 7/2004 | Koellisch et al. | |
| 6,952,979 B2 | 10/2005 | Cartwright et al. | |
| 7,331,608 B2 | 2/2008 | Armstrong et al. | |
| 7,533,594 B2 | 5/2009 | Menjak et al. | |
| 7,685,903 B2 | 3/2010 | Streng et al. | |
| 7,827,880 B2 | 11/2010 | Riefe et al. | |
| 8,201,475 B2 | 6/2012 | Rouleau et al. | |
| 8,327,733 B2 | 12/2012 | Ozsoylu et al. | |
| 2009/0114055 A1 | 5/2009 | Stroud | |
| 2009/0241721 A1 | 10/2009 | Inoue et al. | |
| 2010/0288068 A1 | 11/2010 | Klukowski | |
| 2010/0300236 A1 | 12/2010 | Goulay et al. | |

(Continued)

*Primary Examiner* — Troy Chambers
*Assistant Examiner* — Jake Cook
(74) *Attorney, Agent, or Firm* — Cantor Colburn LLP

(57) ABSTRACT

A position lock for an adjustable steering column comprises a plurality of discs stacked for rotation on a control shaft and engaged to a gear profile of a stationary bracket. The discs are engaged to the gear profile so as to be caused to rotate relatively to one another as the steering column undergoes movement in the relevant direction. The discs are configured to resist rotation relative to one another when subjected to a compressive load, and the control shaft is engaged to a cam for selectively applying a compressive load to the discs. A method for selectively controlling motion of a steering column comprises coupling motion of the steering column to the relative movements of a plurality of discs, constraining the discs to rotate relative to one another as the steering column undergoes motion in the relevant direction, and selectively adjusting resistance to relative rotation the discs.

18 Claims, 5 Drawing Sheets

(56) References Cited

U.S. PATENT DOCUMENTS

2010/0301593 A1 12/2010 Sakata
2011/0185839 A1 8/2011 Inoue
2013/0174685 A1 7/2013 Yamamoto

* cited by examiner

SYSTEM AND METHOD FOR FIXING A POSITION OF A STEERING COLUMN

CROSS-REFERENCE TO RELATED APPLICATIONS

This application claims priority to U.S. Provisional Patent Application No. 61/493,097 filed on Jun. 3, 2011, the entire contents of which are hereby incorporated by reference herein.

BACKGROUND OF THE INVENTION

The present invention relates generally to locking adjustment mechanisms for steering columns and more specifically to systems and methods for fixing a position a steering column assembly while providing for adjustments in both telescoping and raking directions.

Traditional steering column locks employ a friction locks arranged along the raking and telescoping ranges of motion of the steering column. Such locks can be cumbersome and bulky. They can also be susceptible to dimensional variations experienced in production, resulting in potential quality and reliability issues.

Accordingly, it is desirable to have a system and method for selectively fixing and adjusting a position of a steering column with improved reliability and compactness in size.

SUMMARY OF THE INVENTION

In a first aspect, an adjustable steering column comprises a position lock for selectively resisting raking movement of the steering column. The position lock comprises a plurality of rake-lock discs stacked for rotation on a rake-lock control shaft and engaged to a rake-lock gear profile of a stationary rake-lock bracket. The rake-lock discs are engaged to the rake-lock gear profile so as to be caused to rotate relatively to one another as the steering column undergoes the raking movement. The rake-lock discs are configured to resist rotation relative to one another when subjected to a compressive load, and the rake-lock control shaft is engaged to a rake-lock cam for selectively applying a compressive load to the rake-lock discs.

In a further aspect, a method for selectively controlling motion of a steering column comprises coupling raking motion of the steering column to the relative movements of a plurality of rake-lock discs and constraining the rake-lock discs to rotate relative to one another as the steering column undergoes raking motion. Resistance to relative rotation the rake-lock discs is selectively adjusted.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
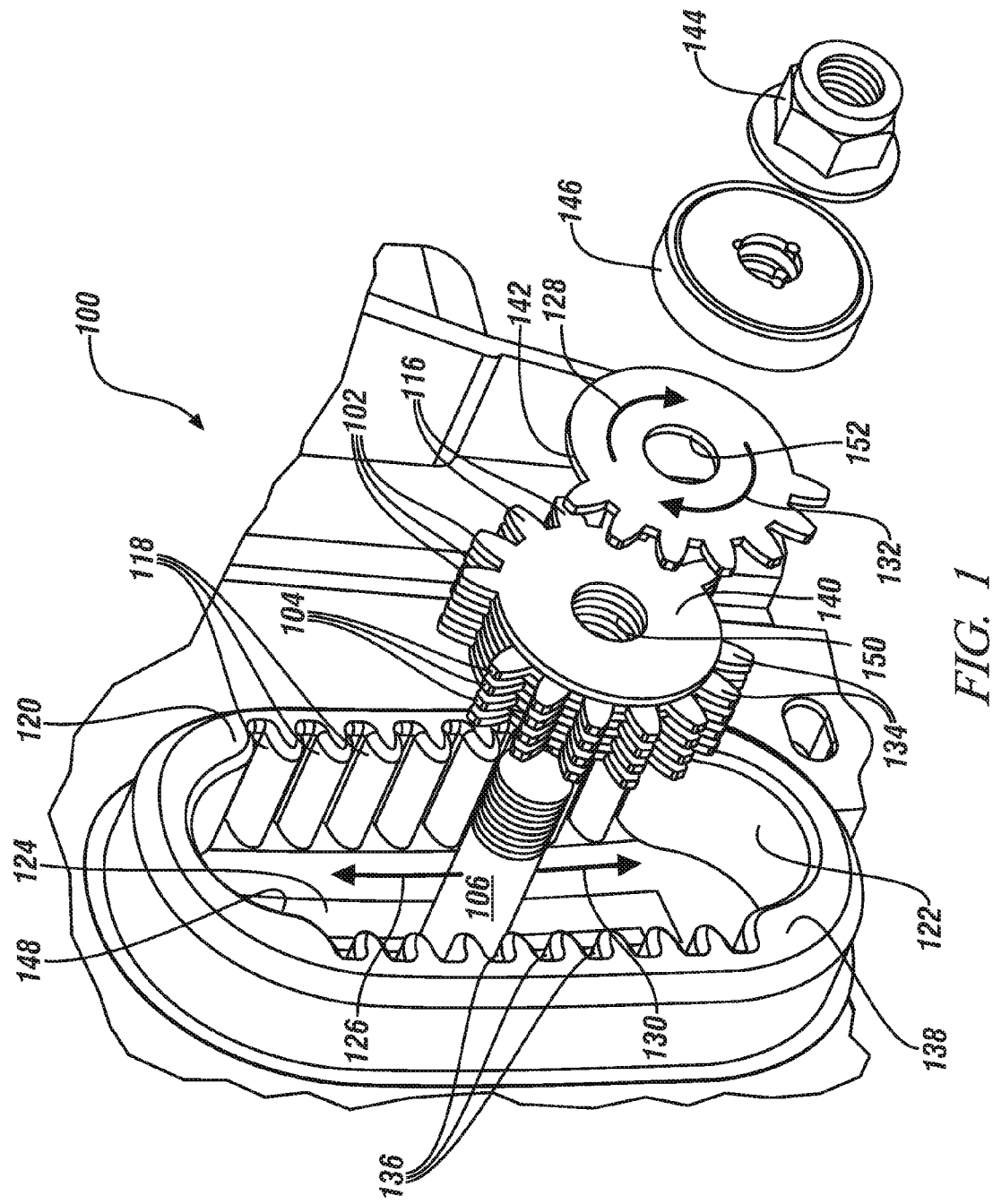
FIG. 1 is a drawing showing an exploded perspective view of an exemplary system for fixing a position of a steering column.

Referring now to the figures, wherein the invention will be described with reference to specific embodiments, without limiting same, FIG. 1 shows an exploded perspective view of an exemplary system 100 for fixing a rake position of a steering column. As shown in FIG. 1, one or more first rake-lock discs 102 and one or more second rake-lock discs 104 are positioned parallel to one another for free rotation about a control shaft 106. In an exemplary embodiment, each of the one or more first rake-lock discs 102 defines a circular hole 150 in approximately its center for mounting on, and facilitating free rotation about, control shaft 106. Similarly, each of the one or more second rake-lock discs 104 defines a circular hole 152 in approximately its center for mounting on, and facilitating free rotation about, control shaft 106.

Figure 2:
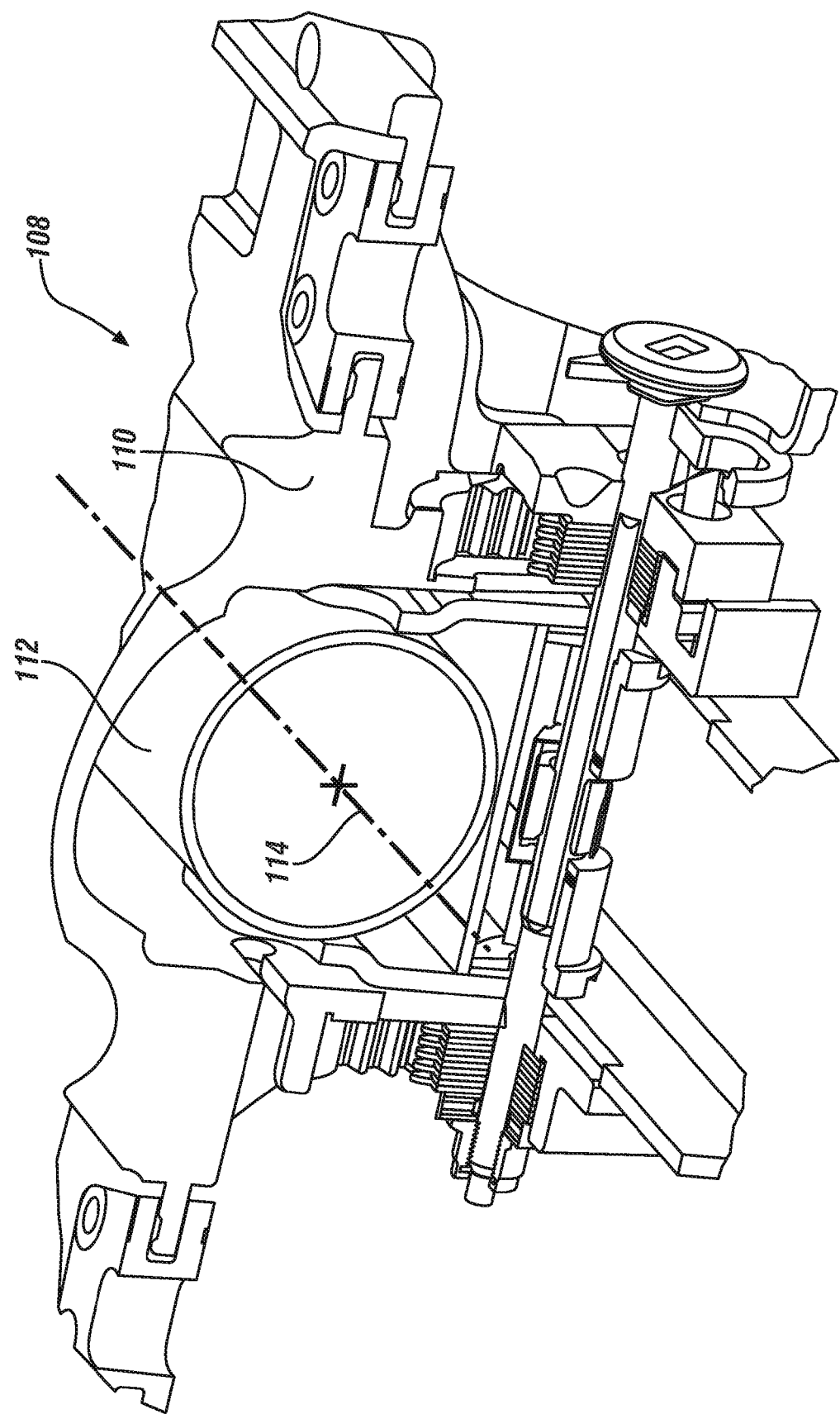
FIG. 2 is a drawing showing a perspective view of an exemplary system for fixing a position of a steering column.
Figure 3:
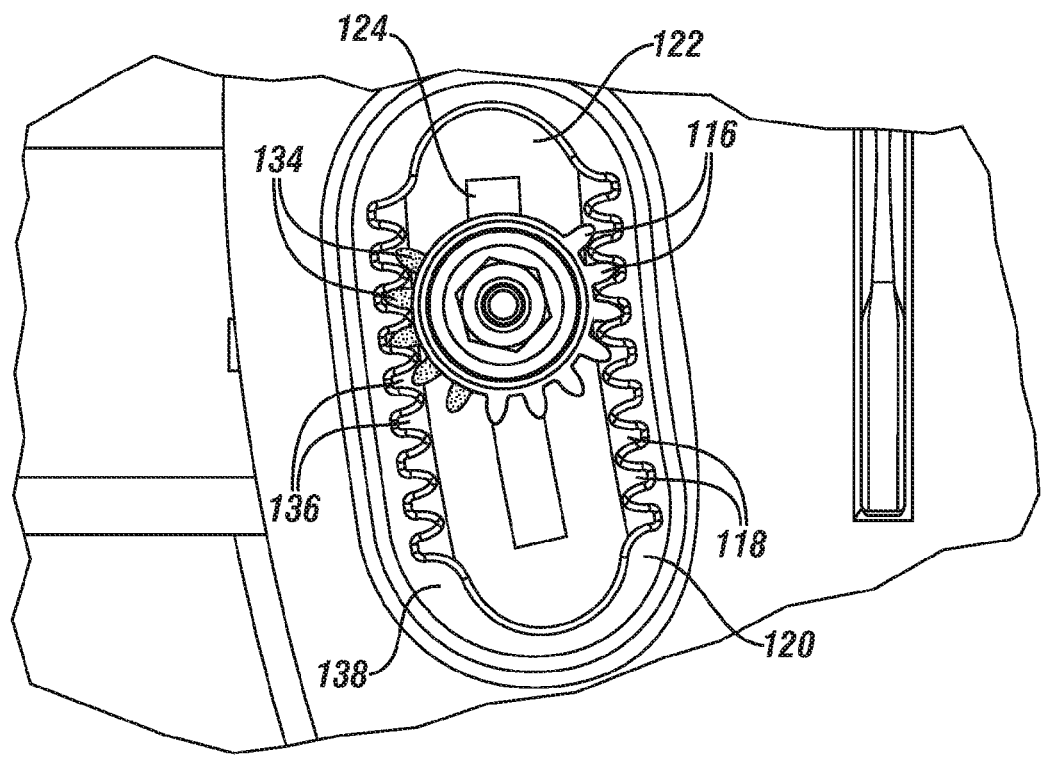
FIG. 3 is a drawing of an exemplary system for fixing a position of a steering column.
Figure 4:
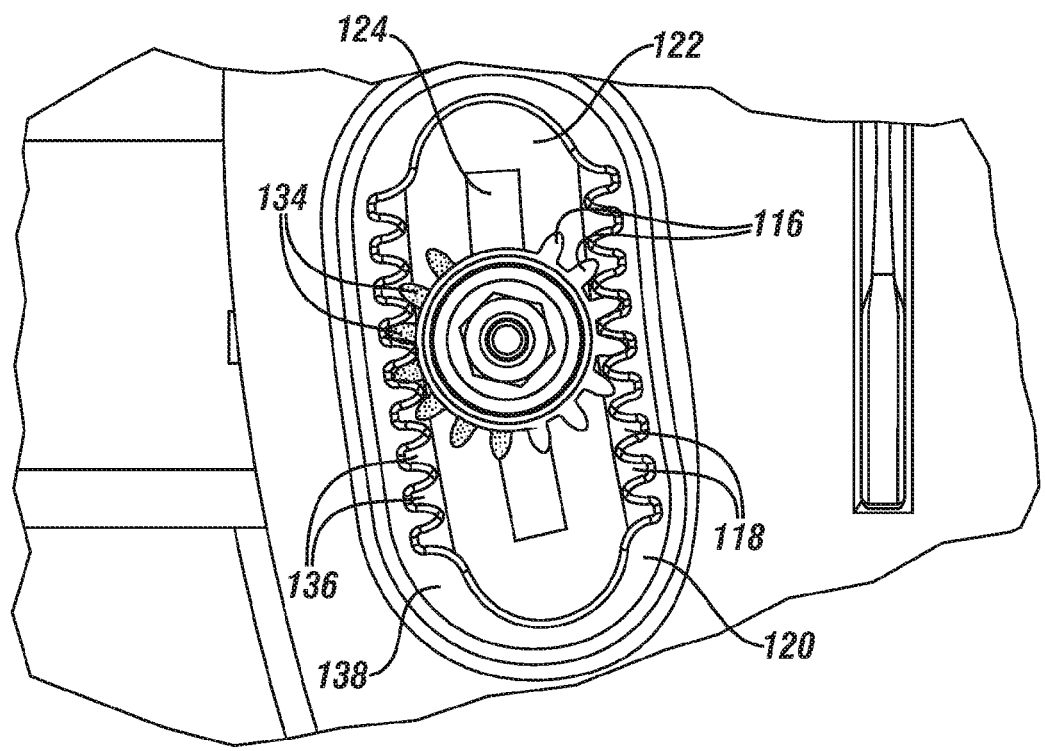
FIG. 4 is a drawing of an exemplary system for fixing a position of a steering column.
Figure 5:
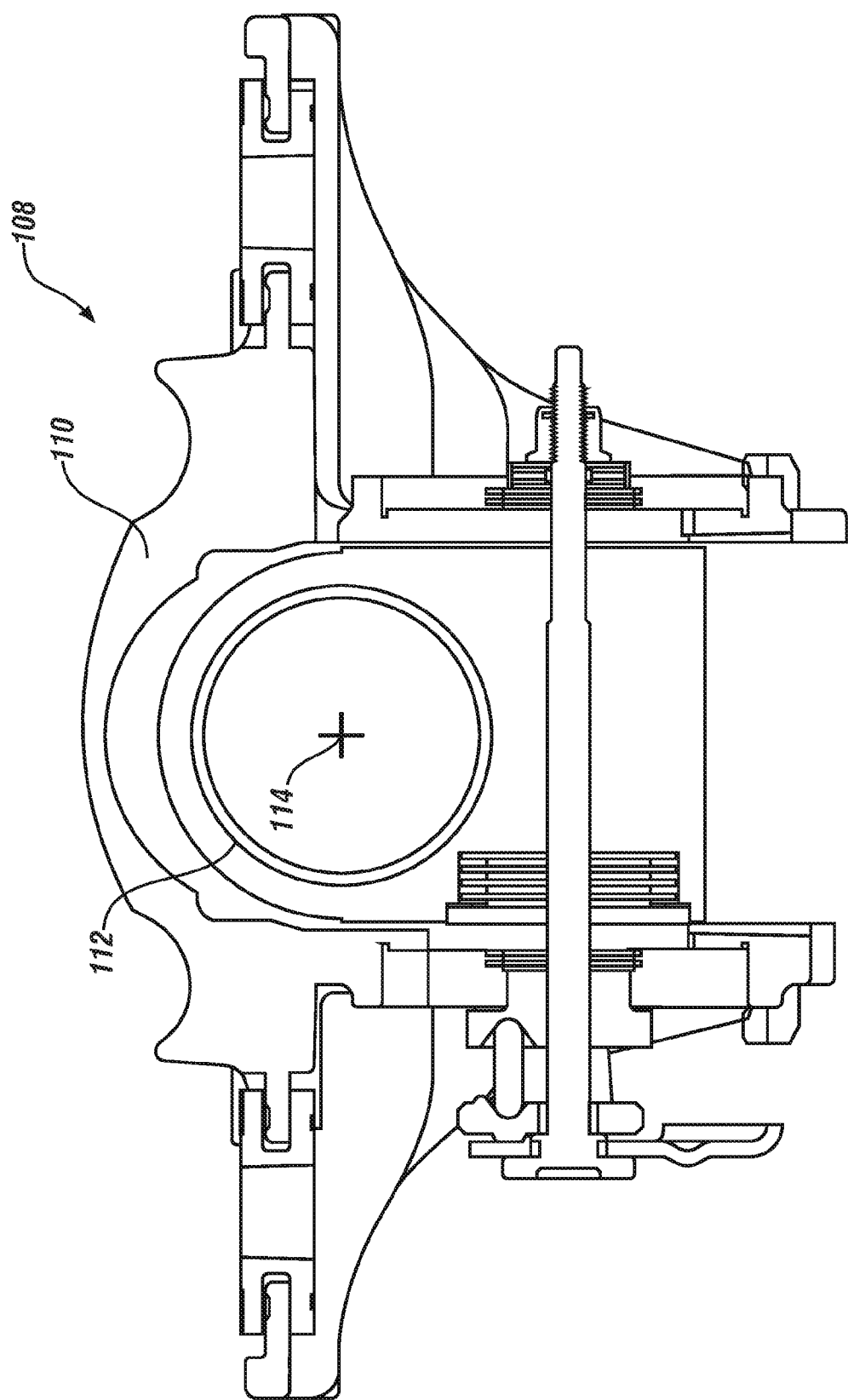
FIG. 5 is a drawing showing a perspective view of an exemplary system for fixing a position of a steering column.
Figure 6:
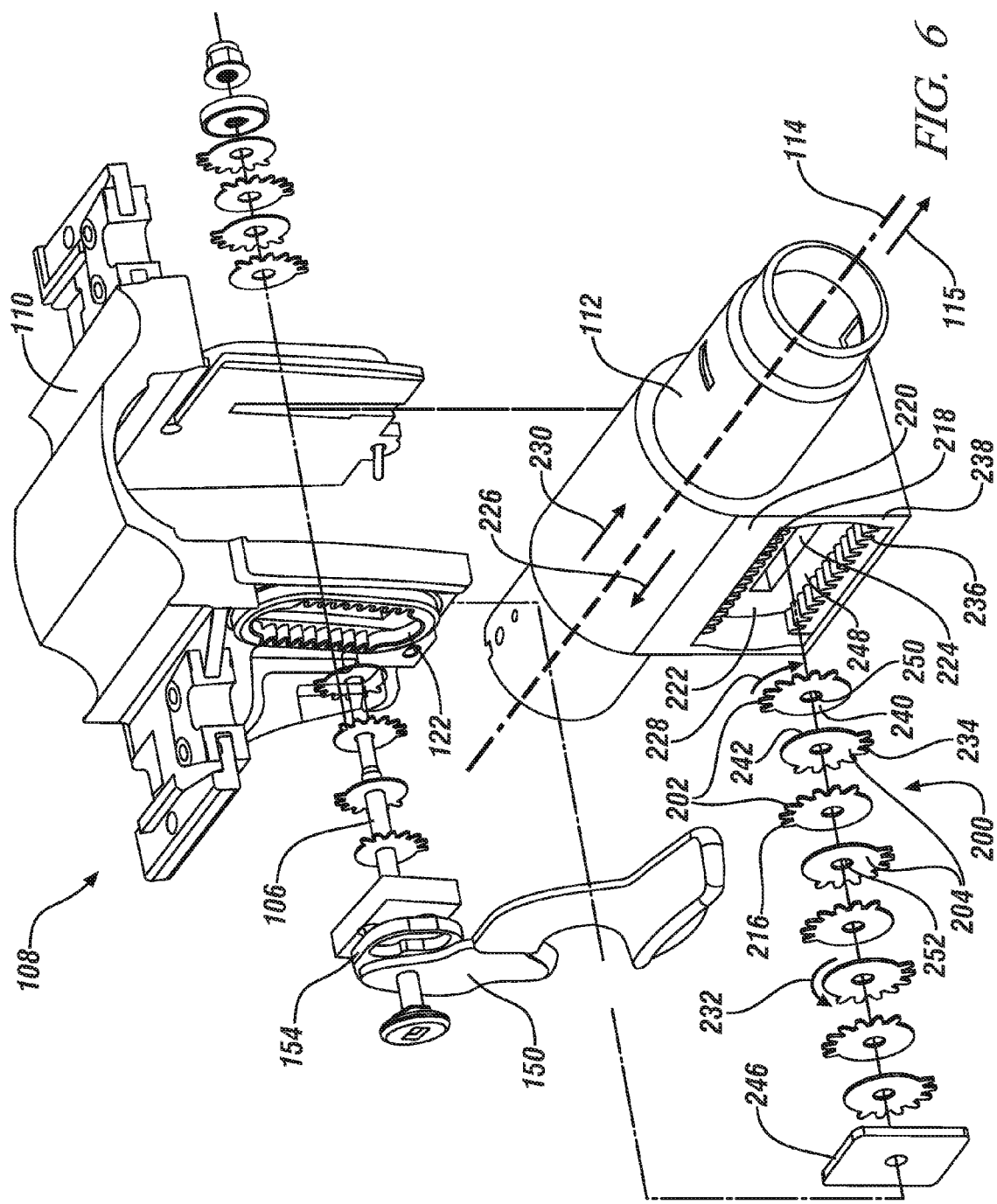
FIG. 6 is a drawing showing an exploded perspective view of an exemplary system for fixing a position of a steering column.

In general, as shown in FIG. 2, FIG. 5, and FIG. 6, a steering column assembly 108 comprises a stationary bracket 110, within which, and relatively to, a steering column 112 translates in a generally vertical direction (i.e., tilts or rakes), approximately transversely to a longitudinal axis 114 defined by the steering column 112. Control shaft 106 is coupled to the steering column 112 in a substantially horizontal orientation, substantially perpendicular to the longitudinal axis 114, such that, as steering column 112 translates in a substantially vertical direction, control shaft 106 also translates in a substantially vertical direction. In addition, the control shaft 106 is coupled to the steering column 112 such that when raking translation of control shaft 106 is impeded, raking translation of steering column 112 is also impeded.

Stationary bracket 110, which is fixed to the automobile, defines a rake-lock channel 122 that surrounds a rake slot 124 oriented along the direction of travel of the control shaft 106 as the control shaft 106 translates with the raking of steering column 112. Control shaft 106 passes through the rake slot 124 and is constrained by rake slot 124 to translate along the rake slot 124. As the control shaft 106 translates along the rake slot 124, transversely to the longitudinal axis of control shaft 106, the one or more first rake-lock discs 102 and the one or more second rake-lock discs 104 also translate along the rake slot 124 within the rake-lock channel 122, together with the control shaft 106.

As can best be seen in FIG. 1 and FIG. 6, each of the one or more first rake-lock discs 102 includes one or more rake-lock teeth 116 configured for engaging and cooperating with a corresponding one or more elongated, stationary, first-side grooves 118 formed in a first side 120 of the rake-lock channel 122 and oriented substantially parallel to control shaft 106. Similarly, each of the one or more second rake-lock discs 104 includes one or more second rake-lock teeth 134 configured for engaging and cooperating with a corresponding one or more elongated, stationary, second-side grooves 136 formed in an opposing side 138 of the rake-lock channel 122 and also oriented substantially parallel to control shaft 106.

The rake-lock channel 122 is disposed along rake slot 124 such that the first side 120, and the second side 138 are arranged generally parallel to the rake slot 124. Accordingly, as the control shaft 106 translates with the raking of steering column 112, the engagement of, and cooperation between, the first rake-lock teeth 116 and the first-side grooves 118 cause the one or more first rake-lock discs 102 to rotate about control shaft 106. Similarly, as the control shaft 106 translates with the raking of steering column 112, the engagement of, and cooperation between, the second rake-lock teeth 134 and the second-side grooves 136 cause discs 104 on control shaft 106 rotate about control shaft 106 in a direction that opposes the rotation of the first rake-lock discs 102.

More specifically, as the control shaft 106 translates with the raking of steering column 112 in a first direction 126, the engagement of, and cooperation between, the first rake-lock teeth 116 and the first-side grooves 118 cause the first rake-lock discs 102 on control shaft 106 rotate in a clockwise direction 128 about control shaft 106. Similarly, as the control shaft 106 translates with the raking of steering column 112 in the first direction 126, the engagement of, and cooperation between, the second rake-lock teeth 134 and the second-side grooves 136 cause discs 104 on control shaft 106 rotate in a counter-clockwise direction 132 about control shaft 106.

In addition, as the control shaft 106 translates with the raking of steering column 112 in a second direction 130, the engagement of, and cooperation between, the first rake-lock teeth 116 and the stationary grooves 118 cause the first rake-lock discs 102 on control shaft 106 rotate in a counter-clockwise direction 132 about control shaft 106. Similarly, as the control shaft 106 translates with the raking of steering column 112 in the second direction 130, the engagement of, and cooperation between, the second rake-lock teeth 134 and the second-side grooves 136 cause discs 104 on control shaft 106 rotate in a clockwise direction 128 about control shaft 106.

In an exemplary embodiment, the engagement of the first rake-lock teeth 116 with the first-side grooves 118 (and the engagement of, and cooperation between, the second rake-lock teeth 134 and the second-side grooves 136) interferes with translation of the control shaft 106 whenever there is any interference with the rotation of the first rake-lock discs 102 about control shaft 106 (or whenever there is any interference with the rotation of the second rake-lock discs 104 about control shaft 106). In this way, translation of the steering column 112 is coupled to the rotation of the first rake-lock discs 102 about the control shaft 106 in a first sense (i.e., relationship between raking direction and rotational direction), while the same translation of the steering column 112 is also coupled to the rotation of the second rake-lock discs 104 about the control shaft 106 in a second, opposing sense.

The first rake-lock discs 102 and the second rake-lock discs 104 occupy alternating positions on control shaft 106 such that each of the first rake-lock discs 102 is adjacent to one or more of the second rake-lock discs 104, and such that each of the second rake-lock discs 104 is adjacent to one or more of the first rake-lock discs 102. Therefore, since the first rake-lock discs 102 rotate with an opposite sense from that of the second rake-lock discs, adjacent discs rotate relatively to one another with raking translation of the steering column.

In an exemplary embodiment, friction between adjacent discs is employed to provide such resistance to relative movement. Thus, in accordance with this embodiment, each of the first rake-lock discs 102 has at least one surface 140 that, when pressed against an adjacent disc 104, tends to impede relative rotation of the adjacent disc 104, and each of the second rake-lock discs 104 has at least one surface 142 that, when pressed against an adjacent first rake-lock disc 102, tends to impede relative rotation of the adjacent disc 102. In accordance with this embodiment, frictional moments between adjacent discs 102, 104 tend to impede relative rotation of neighboring discs 104, 102.

As one skilled in the art will appreciate, in an exemplary embodiment, and under certain conditions, it may possible and desirable to retain either the first rake-lock discs 102 or the second rake-lock discs 104 so as to prevent them from rotating while engaging the other set of discs with the gear teeth for relative rotation as the steering column translates, thereby providing the benefits of the present invention while avoiding the necessity that both sets of rake-lock discs be engaged to stationary teeth.

Control shaft 106 is configured for attachment to a retainer 144, such as a threaded nut, which is useful for applying a compressive force to the first rake-lock discs 102 and the second rake-lock discs 104, by compressing the stack of alternating discs between a washer 146 and a wall 148 of rake-lock channel 122. In an exemplary embodiment, the retainer 144 is positioned so that the above-described compression force is applied as a result of the application of a tension force to control shaft 106. In another exemplary embodiment, the retainer 144 is positioned so that the above-described compression force is applied as a result of the application of a compression force to control shaft 106.

In an exemplary embodiment, the frictional moments imposed by the first rake-lock discs 102 on the second rake-lock discs 104, and by the second rake-lock discs 104 on the first rake-lock discs 102, are directly related to the force applied to control shaft 106. As a result, variations in force applied to control shaft 106 are effective to cause variations in resistance to raking movement of the steering column 112. Accordingly, by controlling the tension (or compression, in certain arrangements) in control shaft 106 (for example, by selectively applying and releasing tension in control shaft 106), raking movement of the steering column can be selectively impeded (i.e., selectively facilitated, resisted, and/or prevented).

FIG. 6 shows an exploded perspective view of an exemplary system 200 for fixing a telescope position of a steering column. As shown in FIG. 6, one or more first telescope lock discs 202 and one or more second telescope lock discs 204 are positioned for free rotation about the control shaft 106. In an exemplary embodiment, each of the first telescope lock discs 202 defines a circular hole 250 in approximately its center for mounting on, and facilitating free rotation about, control shaft 106. Similarly, each of the one or more second telescope lock discs 204 defines a circular hole 252 in approximately its center for mounting on, and facilitating free rotation about, control shaft 106.

In general, as shown in FIG. 6, a steering column assembly 108 comprises a stationary bracket 110, within which, and relatively to, a steering column 112 may translate in a longitudinal direction (i.e., telescoping) 115, approximately parallel to its longitudinal axis 114. As discussed above, control shaft 106 is coupled to the steering column 112 in a substantially horizontal orientation, substantially perpendicular to the longitudinal axis 114, such that, as steering column 112 translates in a substantially longitudinal direction, control shaft 106 remains at a substantially constant location along the longitudinal axis 114 (i.e., at the longitudinal position of the rake slot 124).

Steering column 112, which moves relative to the bracket 110 when the steering column 112 telescopes, defines a telescope lock channel 222 that defines and surrounds a telescope slot 224 oriented along the direction of travel of the steering column 112 as the steering column 112 translates with its telescoping extension. Control shaft 106 passes through the telescope slot 224, which is oriented parallel to the telescoping direction (i.e., parallel to the longitudinal direction). Thus, as the steering column 112 extends and contracts in the telescoping (i.e., longitudinal) direction, the telescope slot 224 moves relative to the control shaft 106.

As the telescope slot 224 moves relatively to the control shaft 106, relative motion is necessarily caused between the first telescope lock discs 202 and the telescope slot 224 within the telescope lock channel 222. As the telescope slot 224 moves relatively to the control shaft 106, relative motion is also necessarily caused between the second telescope lock discs 204 and the telescope slot 224. This is because the first and second telescope lock discs 202, 204 remain positioned on the control shaft 106, which moves relatively to the telescope slot 224 as the steering column 112 telescopes.

As can best be seen in FIG. 6, each of the first telescope lock discs 202 includes one or more first telescope-lock teeth 216 configured for engaging and cooperating with one or more elongated, stationary, first-side grooves 218 formed in a first side 220 of the telescope lock channel 222 and oriented substantially parallel to control shaft 106. Similarly, each of the second telescope lock discs 204 includes one or more second telescope-lock teeth 234 configured for engaging and cooperating with one or more elongated, stationary, second-side grooves 236 formed in a second side 238 of the telescope lock channel 222 and oriented substantially parallel to control shaft 106.

The telescope lock channel 222 is disposed along telescope slot 224 such that the first side 220 and the second side 238 are arranged parallel to the telescope slot 224. Accordingly, as the telescope lock channel 222 translates relatively to the control shaft 106, such as with the telescoping of steering column 112, the engagement of, and cooperation between, the one or more first telescope-lock teeth 216 and the grooves 218 cause the first telescope lock discs 202 on control shaft 106 rotate about control shaft 106. Similarly, as the telescope lock channel 222 translates relatively to the control shaft 106, such as with the telescoping of steering column 112, the engagement of, and cooperation between, the second telescope-lock teeth 234 and the grooves 236 cause the second telescope lock discs 204 on control shaft 106 rotate about control shaft 106 in a direction that opposes the rotation of the first telescope lock discs 202.

More specifically, as the telescope lock channel 222 translates relatively to the control shaft 106, such as with the telescoping of steering column 112 in a first direction 226, the engagement of, and cooperation between, the first telescope lock teeth 216 and the grooves 218 cause the first telescope lock discs 202 on control shaft 106 rotate in a clockwise direction 228 about control shaft 106. Similarly, as the telescope lock channel 222 translates relatively to the control shaft 106, such as with the telescoping of steering column 112 in a first direction 226, the engagement of, and cooperation between, the second telescope-lock teeth 234 and the grooves 236 cause the second telescope lock discs 204 on control shaft 106 to rotate in a counter-clockwise direction 232 about control shaft 106.

In addition, as the telescope lock channel 222 translates relatively to the control shaft 106, such as with the telescoping of steering column 112 in a second direction 230, the engagement of, and cooperation between, the first telescope lock teeth 216 and the grooves 218 cause the first telescope lock discs 202 on control shaft 106 rotate in a counter-clockwise direction 232 about control shaft 106. Similarly, as the telescope lock channel 222 translates relatively to the control shaft 106, such as with the telescoping of steering column 112 in the second direction 230, the engagement of, and cooperation between, the second telescope-lock teeth 234 and the grooves 236 cause the second telescope lock discs 204 on control shaft 106 to rotate in a clockwise direction 228 about control shaft 106.

Similarly, the engagement of the one or more first telescope lock teeth 216 with the one or more stationary grooves 218 (and the engagement of, and cooperation between, the one or more second telescope lock teeth 234 and the one or more stationary grooves 236) interferes with translation of the telescope lock channel 222 relatively to the control shaft 106 whenever there is any interference with the rotation of the first telescope lock discs 202 about control shaft 106 (or whenever there is any interference with the rotation of the second telescope lock discs 204 about control shaft 106). In this way, any translation of the steering column 112 is coupled to the rotation of the first telescope lock discs 202 about the control shaft 106 in a first sense (i.e., according to a first relationship between telescoping translation and rotational direction), while the same translation of the steering column 112 is coupled to the rotation of the second telescope lock discs 204 about the control shaft 106 in a second, opposing sense.

The first telescope-lock discs 202 and the second telescope-lock discs 204 occupy alternating positions on control shaft 106 such that each of the first telescope-lock discs 202 is adjacent to one or more of the second telescope-lock discs 204, and such that each of the second telescope-lock discs 204 is adjacent to one or more of the first telescope-lock discs 202. Therefore, since the first telescope-lock discs 202 rotate with an opposite sense from that of the second telescope-lock discs 204, adjacent discs rotate relatively to one another with telescoping translation of the steering column.

In an exemplary embodiment, friction between adjacent discs is employed to provide such resistance to relative movement. Thus, in accordance with this embodiment, each of the first telescope-lock discs 202 has at least one surface 240 that, when pressed against an adjacent disc 204, tends to impede relative rotation of the adjacent disc 204, and each of the second telescope-lock discs 204 has at least one surface 242 that, when pressed against an adjacent first telescope-lock disc 202, tends to impede relative rotation of the adjacent disc 202. In accordance with this embodiment, frictional moments between adjacent discs 202, 204 tend to impede relative rotation of neighboring discs 204, 202.

As one skilled in the art will appreciate, in an exemplary embodiment, and under certain conditions, it may possible and desirable to retain either the first telescope-lock discs 202 or the second telescope-lock discs 204 so as to prevent them from rotating while engaging the other set of discs with the gear teeth for relative rotation as the steering column telescopes, thereby providing the benefits of the present invention while avoiding the necessity that both sets of telescope-lock discs be engaged to stationary teeth.

Control shaft 106 is configured so that as a compressive force is applied to the first rake-lock discs 102 and the second rake-lock discs 104, a similar compressive force is also applied to the first telescope-lock discs 202 and the second telescope-lock discs 204 by compressing the stack of alternating discs between a fender 246 and a wall 248 of telescope-lock channel 222. In an exemplary embodiment, the fender 246 is positioned so that the above-described compression force is applied as a result of the application of a tension force to control shaft 106. In another exemplary embodiment, the fender 246 is positioned so that the above-described compression force is applied as a result of the application of a compression force to control shaft 106.

In an exemplary embodiment, the frictional moments imposed by the first telescope-lock discs 202 on the second telescope-lock discs 204, and by the second telescope-lock discs 204 on the first telescope-lock discs 202, are directly related to the force applied to control shaft 106. As a result, variations in force applied to control shaft 106 are effective to cause variations in resistance to telescoping movement of the steering column 112. Accordingly, by controlling the tension (or compression, in certain arrangements) in control shaft 106 (for example, by selectively applying and releasing tension in control shaft 106), telescoping movement of the steering column can be selectively impeded (i.e., selectively facilitated, resisted, and/or prevented).

The tension in the shaft, and thus the compressive forces applied to the one or more first and second rake-lock discs 102, 104, and between the first and second telescope-lock discs 202, 204, may be adjusted by tightening or loosening the nut 144 and or by actuating a cam 154. In an exemplary embodiment, as shown in FIGS. 5 and 6, cam 154 is positioned and configured so that when an operator rotates a control lever 156 that is operatively coupled with the cam 154, the position of the cam 154 changes so that the tension in the control shaft 106 also changes. Frictional forces between the relatively moving plates may be controlled by adjusting the compressive forces between adjacent discs. Thus, to lock the steering column in a particular position, the compressive load is increased. To permit adjustment of the steering column, the compressive forces are decreased. As the position of the steering column is adjusted, the discs are constrained to move relative to one another. Resistance to this relative movement is provided by friction between the discs.

As one skilled in the art will appreciate, the discs may be constructed of any dimensionally stable material such as ceramic or metal. Materials resistant to corrosion such as stainless steel or galvanized metal may be employed to prevent corrosive bonding between the discs. In addition, discs 102 and 104 may be positioned on only a right side of the steering column, on only a left of the steering column, or on both sides of the steering column so as to meet design considerations associated with a particular implementation. Still further, discs 202 and 204 may be positioned on only a right side of the steering column, on only a left of the steering column, or on both sides of the steering column so as to meet design considerations associated with a particular implementation.

Thus, in an exemplary embodiment, a plurality of discs are stacked for rotation on a shaft and engaged to a stationary bracket. The discs are caused by a gear profile or other synchronizing feature to rotate relatively to one another as a steering column is moved in a manner that is desired to be selectively limited, such as telescoping or raking motion of a steering column. Holding load performance is created by providing resistance to relative motion between adjacent discs. Variations in the number of discs and in the synchronizing feature profiles, in the disc materials, the compressive loads applied to the discs, the design of the discs, the surface finish of the discs and other features can be adjusted to achieve desired locking and motion resisting characteristics while accommodating a desired range of motion. Component deformation (e.g., spring loading) can also be used so as to provide desired friction characteristics as the steering column is adjusted.

Telescoping and raking motion is controlled by first coupling the telescoping and raking motion to the relative movements of groups of discs that are constrained to rotate relative to one another as the steering column is adjusted in the telescoping or raking direction and then also selectively increasing or decreasing resistance to that relative movement between adjacent discs. In an exemplary embodiment, this selective adjustment is accomplished by increasing or decreasing the tension in a shaft so as to increase the normal (compressive) forces between adjacent discs, thereby affecting the friction between adjacent, counter-rotating discs. In an extreme case, the frictional forces resisting relative movement are sufficient to oppose typical operator-induced forces associated with operation of the motor vehicle, but are not so great as to resist movement of the steering column in the event of an accident. As a result, a system and method for selectively fixing and adjusting a position of a steering column with improved reliability and compactness in size while also providing for an infinitely (i.e., continuously) variable range of raking and telescoping positions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column comprising a position lock for selectively resisting raking movement of the steering column;
   the position lock comprising a plurality of rake-lock discs stacked for rotation on a rake-lock control shaft and engaged to a rake-lock gear profile of a stationary rake-lock bracket;
   the rake-lock discs being engaged to the rake-lock gear profile so as to be caused to rotate relatively to one another as the steering column undergoes the raking movement;
   the rake-lock discs being configured to resist rotation relative to one another when subjected to a compressive load;
   the rake-lock control shaft being engaged to a rake-lock cam for selectively applying a compressive load to the rake-lock discs.

2. The adjustable steering column of claim 1, the position lock further comprising a plurality of telescope-lock discs stacked for rotation on a telescope-lock shaft and engaged to a telescope-lock gear profile of a stationary telescope-lock bracket;
   the telescope-lock discs being engaged to the telescope-lock gear profile so as to be caused to rotate relatively to one another as the steering column undergoes the telescoping movement;
   the telescope-lock discs being configured to resist rotation relative to one another when subjected to a compressive load;
   the telescope-lock control shaft being engaged to a telescope-lock cam for selectively applying a compressive load to the telescope-lock discs.

3. The adjustable steering column of claim 2, wherein the rake-lock control shaft and the telescope-lock control shaft are joined so as to form a single position-lock control shaft such that the plurality of rake-lock discs and the plurality of telescope-lock discs are stacked for rotation on the single position-lock control shaft.

4. The adjustable steering column of claim 1, wherein the rake-lock control shaft is coupled to the steering column such that when raking translation of rake-lock control shaft is impeded, raking translation of steering column is also impeded.

5. The adjustable steering column of claim 1, wherein the stationary rake-lock bracket is fixed to the automobile and defines a rake-lock channel that surrounds a rake slot oriented along the raking direction, and wherein the rake-lock control shaft passes through the rake slot.

6. The adjustable steering column of claim 5, wherein the rake-lock discs are disposed on the rake-lock control shaft for translation within the rake-lock channel as the rake-lock control shaft translates with the raking movement of the steering column.

7. The adjustable steering column of claim 6:
wherein the rake-lock channel has a first side and a second side, the first side and the second side being arranged parallel to the rake slot on opposing sides of the rake slot; wherein at least one of the rake-lock discs is a first rake-lock disc that includes one or more first rake-lock teeth configured and positioned for engaging with a corresponding first-side groove formed in the first side of the rake-lock channel; and
wherein at least one other of the rake-lock discs is a second rake-lock disc that includes one or more second rake-lock teeth configured and positioned for engaging with a corresponding second-side groove formed in the second side of the rake-lock channel.

8. The adjustable steering column of claim 7:
wherein the control shaft is disposed in the rake slot such that, as the control shaft translates with raking movement of the steering column, cooperation between the first rake-lock teeth and the first-side groove causes the one or more first rake-lock discs to rotate about the rake-lock control shaft with a first sense, and such that cooperation between the second rake-lock teeth and the second-side groove causes the one or more second rake-lock discs to rotate about the rake-lock control shaft in a second sense that opposes the rotation of the first rake-lock discs.

9. The adjustable steering column of claim 2, wherein the telescope-lock control shaft is coupled to the steering column such that when telescoping translation of telescope-lock control shaft is impeded, telescoping translation of steering column is also impeded.

10. The adjustable steering column of claim 2, wherein the stationary telescope-lock bracket is fixed to the automobile and defines a telescope-lock channel that surrounds a telescope slot oriented along the telescoping direction, and wherein the telescope-lock control shaft passes through the telescope slot.

11. The adjustable steering column of claim 10, wherein the telescope-lock discs are disposed on the telescope-lock control shaft for translation within the telescope-lock channel as the telescope-lock control shaft translates with the telescoping movement of the steering column.

12. The adjustable steering column of claim 11:
wherein the telescope-lock channel has a first side and a second side, the first side and the second side being arranged parallel to the telescope slot on opposing sides of the telescope slot; wherein at least one of the telescope-lock discs is a first telescope-lock disc that includes one or more first telescope-lock teeth configured and positioned for engaging with a corresponding first-side groove formed in the first side of the telescope-lock channel; and
wherein at least one other of the telescope-lock discs is a second telescope-lock disc that includes one or more second telescope-lock teeth configured and positioned for engaging with a corresponding second-side groove formed in the second side of the telescope-lock channel.

13. The adjustable steering column of claim 12:
wherein the control shaft is disposed in the telescope slot such that, as the control shaft translates with raking movement of the steering column, cooperation between the first telescope-lock teeth and the first-side groove causes the one or more first telescope-lock discs to rotate about the telescope-lock control shaft with a first sense, and such that cooperation between the second telescope-lock teeth and the second-side groove causes the one or more second telescope-lock discs to rotate about the telescope-lock control shaft in a second sense that opposes the rotation of the first telescope-lock discs.

14. A method for selectively controlling motion of a steering column comprising:
coupling raking motion of the steering column to the relative movements of a plurality of rake-lock discs;
constraining the rake-lock discs to rotate relative to one another as the steering column undergoes raking motion; and
selectively adjusting resistance to relative rotation the rake-lock discs;
wherein the step of coupling comprises stacking the rake-lock discs for rotation on a rake-lock control shaft and engaging the rake-lock discs to a rake-lock gear profile of a stationary rake-lock bracket so as to cause the rake-lock discs to rotate relatively to one another as the steering column undergoes the raking movement.

15. The method of claim 14, wherein the step of selectively adjusting resistance comprises
configuring the rake-lock discs to resist rotation relative to one another when subjected to a compressive load; and
selectively applying a compressive load to the rake-lock discs.

16. The method of claim 14, further comprising:
coupling telescoping motion of the steering column to the relative movements of a plurality of telescope-lock discs;
constraining the telescope-lock discs to rotate relative to one another as the steering column undergoes telescoping motion; and
selectively adjusting resistance to relative rotation the telescope-lock discs.

17. A method for selectively controlling motion of a steering column comprising:
coupling raking motion of the steering column to the relative movements of a plurality of rake-lock discs;
constraining the rake-lock discs to rotate relative to one another as the steering column undergoes raking motion;
selectively adjusting resistance to relative rotation the rake-lock discs;
coupling telescope in motion of the steering column to the relative movements of a plurality of telescope-lock discs;
constraining the telescope-lock discs to rotate relative to one another as the steering column undergoes telescoping motion; and
selectively adjusting resistance to relative rotation the telescope-lock discs;
wherein the step of coupling telescoping motion of the steering column comprises stacking the telescope-lock discs for rotation on a telescope-lock control shaft and engaging the telescope-lock discs to a telescope-lock gear profile of a stationary telescope-lock bracket so as to cause the telescope-lock discs to rotate relatively to one another as the steering column undergoes the telescoping movement.

18. The method of claim 17, wherein the step of selectively adjusting resistance to relative rotation the telescope-lock discs comprises configuring the telescope-lock discs to resist rotation relative to one another when subjected to a compressive load; and selectively applying a compressive load to the telescope-lock discs.

* * * * *